No. 866,081. PATENTED SEPT. 17, 1907.
G. STERN.
CONTROL OF SEPARATELY EXCITED GENERATORS.
APPLICATION FILED JAN. 23, 1907.
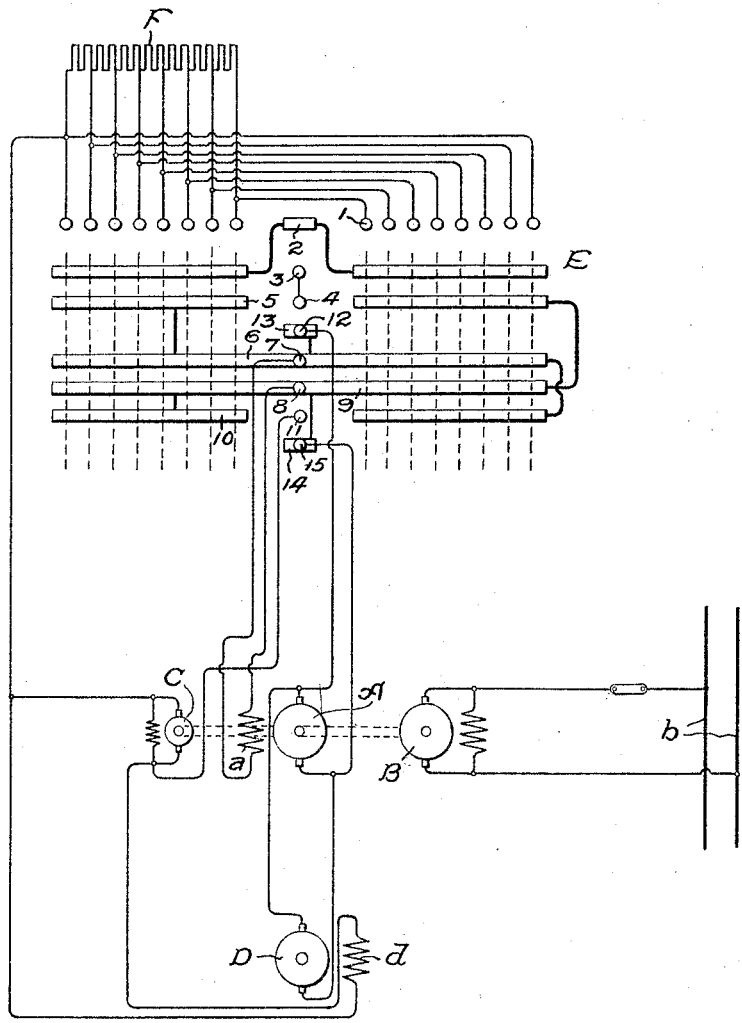
Witnesses:
Marcus L. Byng.
Lloyd C. Bush
Inventor:
Georg Stern,
by Albert G. Davis
Att'y.

UNITED STATES PATENT OFFICE.

GEORG STERN, OF BERLIN, GERMANY, ASSIGNOR TO GENERAL ELECTRIC COMPANY, A CORPORATION OF NEW YORK.

CONTROL OF SEPARATELY-EXCITED GENERATORS.

No. 866,081.  Specification of Letters Patent.  Patented Sept. 17, 1907.

Application filed January 23, 1907. Serial No. 353,626.

*To all whom it may concern:*

Be it known that I, GEORG STERN, a subject of the King of Prussia and Emperor of Germany, residing at Berlin, Germany, have invented certain new and useful Improvements in Control of Separately-Excited Generators, of which the following is a specification.

My invention relates to the control of separately-excited generators, and its object is to provide a novel method of control, whereby the generator voltage may be reduced absolutely to zero.

Separately-excited generators have been frequently employed heretofore for purposes of motor-control where a wide range of speed is required. By supplying the motor armature from a separately-excited generator and varying the field-strength of the generator, the voltage supplied to the motor armature may be varied over wide limits, so as to vary the speed correspondingly, while maintaining a constant field-excitation on the motor. Such control systems heretofore have not been arranged to reduce the generator voltage absolutely to zero. Even when the field-circuit of the generator is broken, the generator produces a voltage due to residual magnetism, which, unless the armature circuit is broken, supplies a current to the motor, so that if the motor is lightly loaded it may continue to turn slowly. Even if an automatic brake is provided for stopping the motor when the generator field-circuit is broken, the generator armature will be short-circuited through the ohmic resistance of the motor armature, and the voltage due to the residual magnetism may be sufficient to cause an appreciable current to flow in the short-circuit. The flow of current due to residual magnetism may of course be avoided by breaking the armature circuit, but this is frequently undesirable and complicates the control.

By my invention the generator-voltage may be reduced absolutely to zero, so that the armature circuit may be maintained closed at all times.

My invention consists in not only disconnecting the generator field from the separate exciter, when it is desired to reduce the generator voltage to zero, but also in connecting the generator field in shunt to its armature in such a way that the voltage due to the residual magnetism supplies a current to the field, which acts to annihilate the residual magnetism.

My invention further consists in arranging the controlling switch for producing this connection in its off-position.

My invention will best be understood by reference to the accompanying drawing, which shows diagrammatically a control system arranged in accordance with my invention.

In the drawing A represents the armature and $a$ the field of a separately-excited generator. This generator may be driven in any suitable manner, as, for instance, by the shunt motor B supplied from the constant potential mains $b$.

C represents the separate exciter for the generator, and may consist of a small generator mounted on the shaft of the main generator, as shown, or of any other suitable source of current, such as a battery.

D represents the armature and $d$ the field of a motor supplied from the generator A. The motor armature D is permanently connected to the terminals of the generator armature A, while the motor field $d$ is supplied with a constant excitation from the exciter C.

E represents a controlling switch, which is arranged to connect the generator field $a$ to the exciter C, to vary the current supplied to the generator field, and in its off-position to connect the generator field $a$ in shunt to its armature.

F represents a variable resistance arranged to be connected in series with the generator field $a$ by the switch E.

The switch E is shown in its off-position. Neglecting for the moment the connections established in this position, it will be seen that if the switch E is moved in either direction, for instance, toward the right, a circuit will be closed from the upper terminal of exciter C through resistance F, contacts 1, 2, 3, 4, 5, 6 and 7, through field $a$, and through contacts 8, 9, 10 and 11, to the lower terminal of exciter C. The generator field $a$ is thus connected to the exciter with all of resistance F in series. As the movement of the switch is continued, resistance F is gradually cut out of circuit. If the switch E had been moved in the opposite direction from off-position, the same circuit connections would have been established, except that the connections of the field $a$ would have been reversed, so that the voltage delivered by the generator A would have been reversed. Now, if the switch E is returned to its off-position, the generator field $a$ is disconnected from the exciter C and is connected in shunt to the generator armature A. This circuit may be traced from the upper brush of armature A to contacts 12, 13, 6 and 7, through generator field $a$, and contacts 8, 9, 14 and 15, to the lower brush to armature A. When this connection is made, the armature voltage due to residual magnetism will send a current through the field winding, which will tend to increase or diminish the armature voltage. When the connection is properly made to reduce the armature voltage, the current supplied by the residual magnetism will act to annihilate that magnetism, and will result in reducing the armature voltage completely to zero. Consequently, all current supplied to the motor is as effectually stopped as if the armature circuit were broken; so that no switch in the armature circuit is required.

What I claim as new and desire to secure by Letters Patent of the United States, is:—

1. The method of controlling a separately-excited generator, which consists in supplying a variable current to the generator field from an external source to vary the voltage delivered by said generator, and in connecting the generator field in shunt to its armature to reduce the generator voltage.

2. The method of reducing to zero the voltage of a separately-excited generator, which consists in disconnecting the generator field from the separate exciter and connecting it in shunt to the generator armature to annihilate the residual magnetism of the field.

3. In combination with a separately-excited generator and a translating device supplied thereby, means for controlling the field-strength of the generator to vary the voltage supplied to said device, and means for connecting the generator field in shunt to its armature to reduce the generator voltage to zero.

4. In combination with a generator and a translating device supplied thereby, a separate source of current for the generator field, means for varying the current supplied by said source to the field, and means for disconnecting the field from said source and connecting it in shunt to the generator armature to annihilate the generator voltage due to residual magnetism.

5. In combination with a generator and a translating device supplied thereby, a separate source of current, and a controlling switch adapted to connect the generator field to said source, to vary the amount of current supplied to the field by said source, and in its off-position to disconnect the field from said source and to connect it in shunt to the generator armature.

In witness whereof, I have hereunto set my hand this 2d day of January, 1907.

GEORG STERN.

Witnesses:
HEINRICH HUSCRANZ,
AUGUST ELFER.